United States Patent [19]

Kim

[11] Patent Number: 5,503,696
[45] Date of Patent: Apr. 2, 1996

[54] METHOD FOR FABRICATING A MAGNETIC HEAD

[75] Inventor: Tae H. Kim, Yangchon-ku, Rep. of Korea

[73] Assignee: Samsung Electro-Mechanics Co., Ltd., Suwon, Rep. of Korea

[21] Appl. No.: 234,276

[22] Filed: Apr. 28, 1994

[30] Foreign Application Priority Data

Apr. 28, 1993 [KR] Rep. of Korea ............... 93-7183
Apr. 22, 1994 [KR] Rep. of Korea ............... 94-8486

[51] Int. Cl.⁶ ................................................ G11B 5/147
[52] U.S. Cl. ................. 156/74; 118/52; 156/256; 156/260; 156/264; 360/126; 427/240
[58] Field of Search ...................... 29/603; 360/126; 156/74, 256, 260, 264; 118/52; 427/240

[56] References Cited

U.S. PATENT DOCUMENTS 3,813,693  5/1974  Gooch ............................. 360/119
4,713,297  12/1987  Verbunt ......................... 360/126 X
5,079,664  1/1992  Miyaguchi ....................... 360/126
5,170,301  12/1992  Muraoka et al. ............... 360/126 X

FOREIGN PATENT DOCUMENTS

400966  12/1990  European Pat. Off. ........... 360/126
62-257611  11/1987  Japan .............................. 360/126

Primary Examiner—Jeff H. Aftergut
Attorney, Agent, or Firm—Ladas & Parry

[57] ABSTRACT

A method for fabricating a magnetic head includes steps of stacking a magnetic layer on a ceramic substrate, coating an adhesive over the magnetic layer while rotating the substrate in a predetermined speed, forming a substrate block by stacking a plurality of substrates, and forming at least one pair of magnetic ferrite blocks by vertically and longitudinally slicing the substrate block. The adhesive is consistently coated on a gap formation plane of the magnetic ferrite block while being rotated by a predetermined speed, the pair of ferrite blocks are pressed to be bonded to each other, thereby completing the magnetic head.

7 Claims, 6 Drawing Sheets

METHOD FOR FABRICATING A MAGNETIC HEAD

BACKGROUND OF THE INVENTION

1. Field of the Invention

The present invention relates to a method for fabricating a magnetic head, and more particularly to a method for fabricating a magnetic head, wherein magnetic core members of a magnetic head fixed on a turntable of a spin coater are bonded to each other by consistently coating a liquid adhesive at a normal temperature under the state of high speed rotation of the turntable to adhere the core members at the normal temperature, thereby facilitating control of the thickness variation without degrading the magnetic head.

2. Description of the Prior Art

Along with increase of a recording density of a magnetic tape used as a recording medium of a video tape recorder, a magnetic tape having a high residual flux density Br and high coercive force Hc, e.g., a metal magnetic tape which forms a magnetic recording layer by coating metal powders on a non-magnetic body by a binding material, is being widely utilized. When a magnetic head is employed for the metal tape and digital audio tape, the magnetic field intensity of a magnetic gap of the head must be increased owing to the high coercive force of the tapes, which requires a higher saturation magnetic flux density in a magnetic erasing head for erasing signals written on the tape.

Therefore, a head obtained by stacking a ferromagnetic film having a high saturation flux density on a magnetic gap formation plane of a magnetic ferrite block composed of metal oxides is developed via a sputtering, which will be schematically explained hereinbelow.

Figure 1:
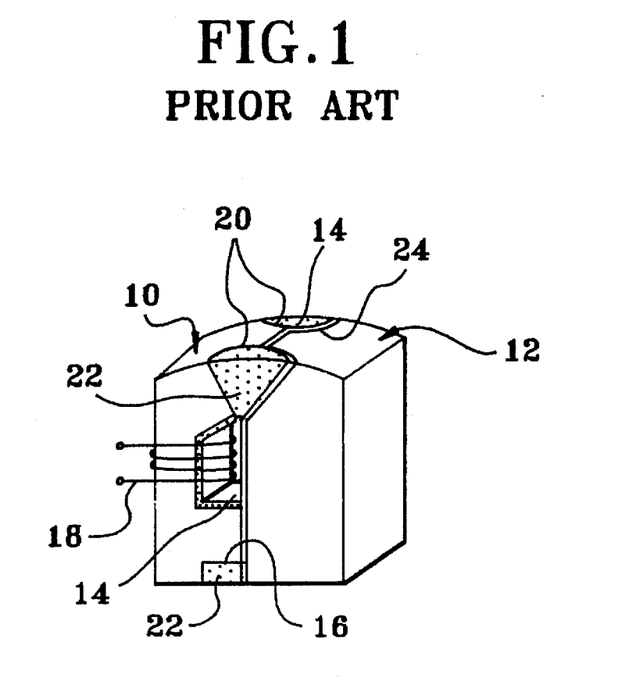
FIG. 1 is a schematically perspective view showing a magnetic head by a conventional technique.

Referring to FIG. 1 which shows a general magnetic head fabricated by a conventional technique, a magnetic head has a pair of magnetic core members 10 and 12 formed of a ferromagnetic substance like ferrite and so forth. A coil groove 14 and a reinforcement groove 16 are provided in the magnetic core member 10, and the coil groove 14 is wound by a coil 18. Joint grooves 20 for restraining a track width are formed in the opposite sides of the pair of magnetic core members 10 and 12, and an adhesive glass 22 having a predetermined melting point fills the joint groove 20 and reinforcement groove 16. By means of the adhesive glass 22, the pair of magnetic core members 10 and 12 can be adhered to each other.

Figure 2:
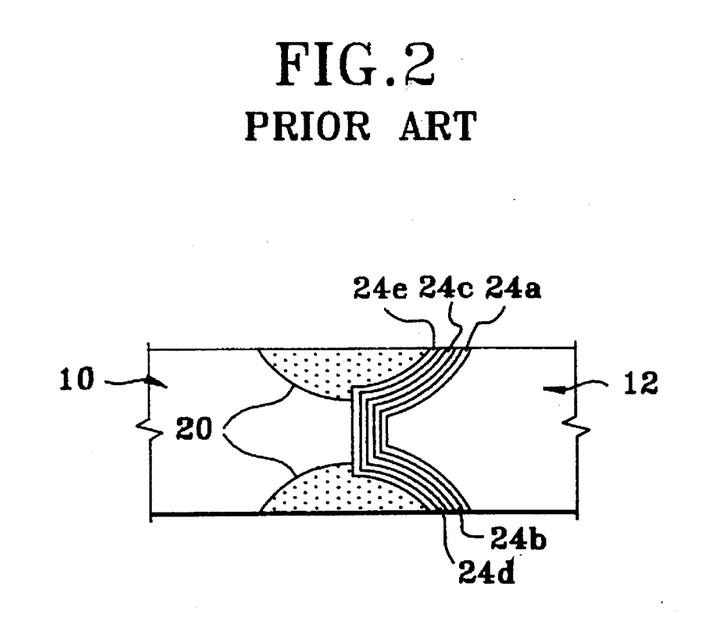
FIG. 2 is an enlarged plan view of the magnetic head shown in FIG. 1.

A stack layer 24 with a silicon dioxide $SiO_2$ is formed on a contact plane including the track-width restraining joint groove 20 of the magnetic core member 12. As shown in FIG. 2, the stacking layer 24 is formed of layers, e.g., a first non-magnetic metal film 24a composed of chromium Cr, a ferromagnetic film 24b of a sendust which is an alloy of Fe—Al—Si(Sendust), a first non-magnetic film 24c of $SiO_2$, a second non-magnetic metal film 24d of Cr and a second non-magnetic film 24e of $SiO_2$, sequentially covering the surface of the magnetic core member 12.

Here, the first non-magnetic metal film 24a is utilized to improve the adhesive intensity between the magnetic ferrite core member 12 and sendust 24b, and the first non-magnetic film 24c of $SiO_2$ and the second non-magnetic metal film 24d are used to form a magnetic gap.

Such a magnetic head is used for digital audio tape recorders, digital video tape recorders or 8 mm-video tape recorders. The pair of magnetic core members 10 and 12 are formed of a ferromagnetic substance such as Mn—Zn group monocrystalline ferrite, and the non-magnetic film of $SiO_2$ is provided in the magnetic gap. A fabricating process of the conventional magnetic head shown in FIG. 1 will be described in detail with reference to FIGS. 3A to 3F.

Figures 3, 3A:
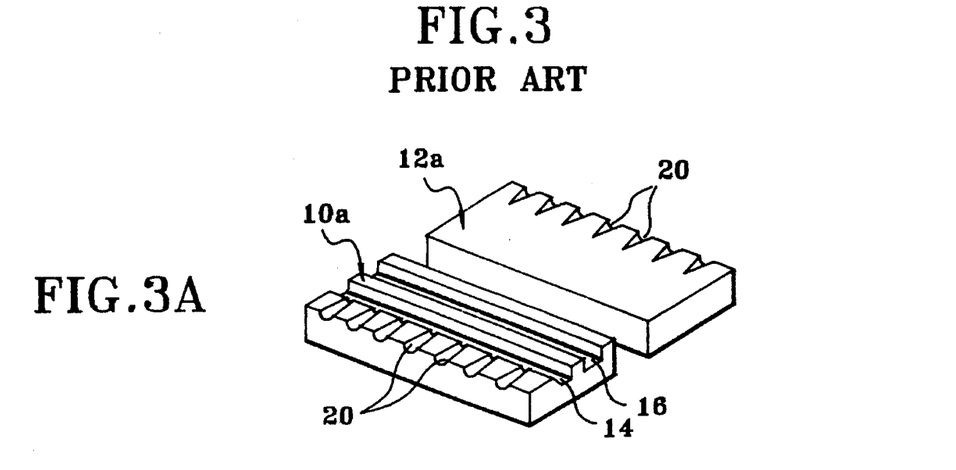
FIGS. 3A to 3F are views for showing a fabricating process of the magnetic head shown in FIG. 1.

FIGS. 3A to 3F illustrates the fabricating steps of the magnetic head shown in FIG. 1. As shown in FIG. 3A, a pair of magnetic core blocks 10a and 12a shaped as a predetermined rectangles by cutting the ferromagnetic substance such as ferrite. After at least one contact plane to be jointed, e.g., a plane of the magnetic core block 12a, is subjected to an abrasion process to be smoothed, the joint grooves 20 for restraining track width by a predetermined interval are provided along the lengthwise direction of the magnetic core blocks 10 and 12a. The magnetic core block 10a has the coil groove 14 and reinforcement groove 16 successively in its lengthwise direction.

Figures 3, 3D:
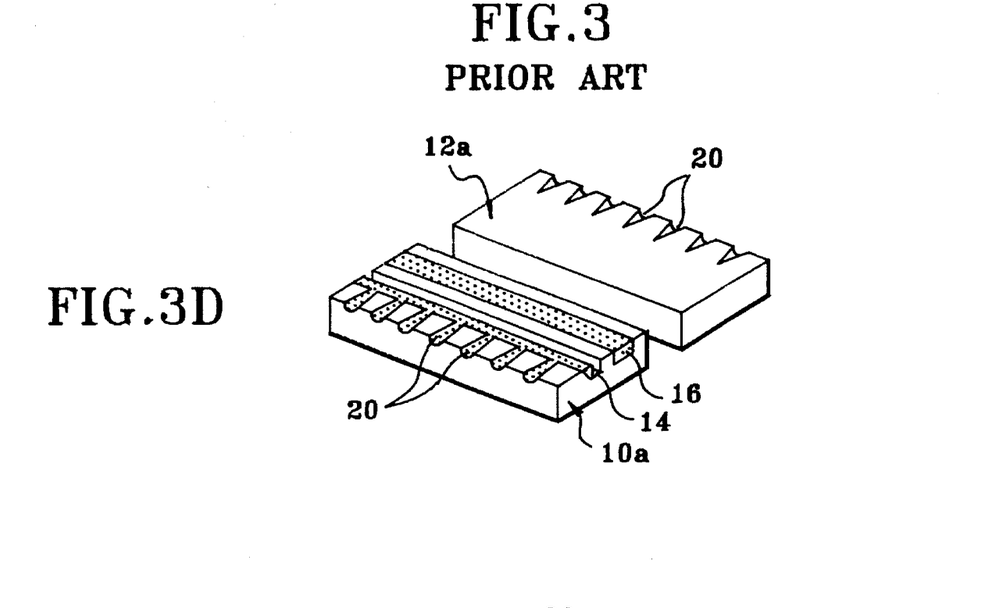
Figure 3B:
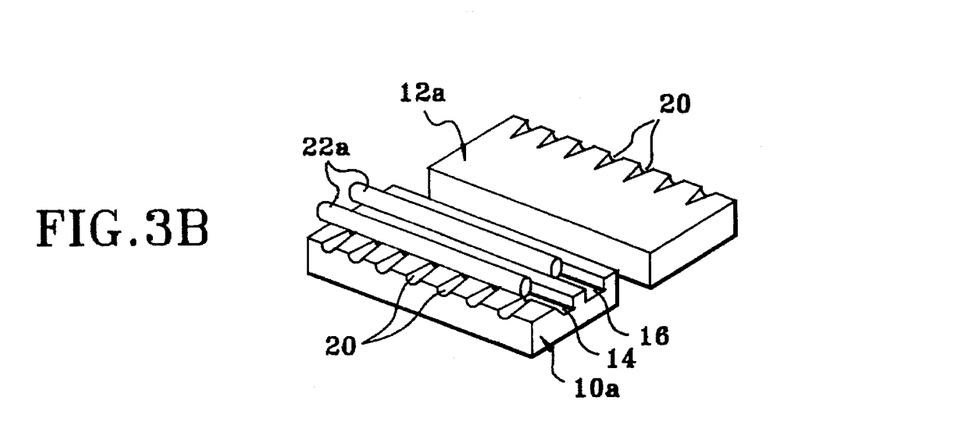

As shown in FIG. 3B, on the magnetic core block 12a, the stacking layer 24 shown in FIG. 2 obtained by successively stacking the first non-magnetic metal film 24a, sendust layer 24b, first non-magnetic film 24c, second non-magnetic metal film 24d and second non-magnetic film 24e is formed via a proper method, e.g., the sputtering. Also, a glass 22a of $SiO_2$—PbO group is put on the track-width restraining joint groove 20, coil groove 14 and reinforcement groove 16 of the magnetic core block 10a.

Figure 3C:
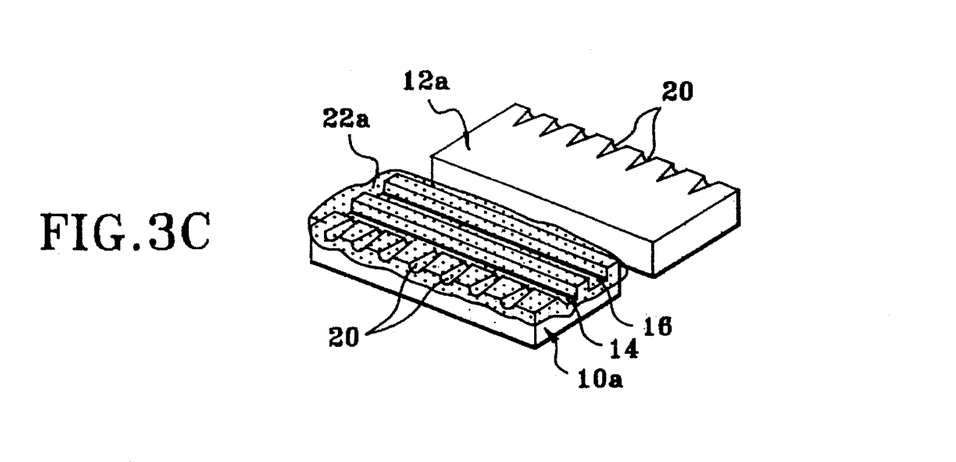

The glass 22a is first heated to be melted, and then the glass 22a having a low melting point fills in the track-width restraining joint groove 20, coil groove 14 and reinforcement groove 16 as shown in FIG. 3C. As shown in FIG. 3D, the glass 22a having the low melting point filling in the coil groove 14 is ground to expose the lower portion of the coil groove 14. The glass 22a out of the track-width restraining joint groove 20, coil groove 14 and reinforcement groove 16 is removed via an abrasion, etc.

Figure 3E:
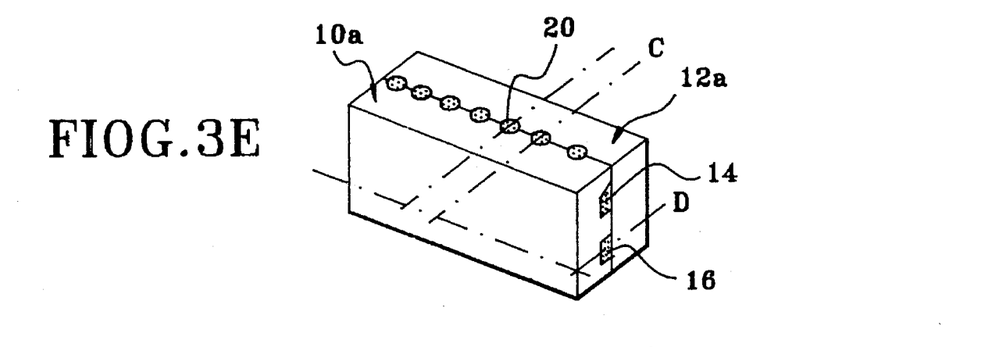

Then, the glass 22a having the low melting point is sputtered onto the joint plane of the magnetic core block 10a. As shown in FIG. 3E, the magnetic core blocks 10a and 12a face to be jointed to each other are secondly heated at the melting temperature of the glass 22a to allow the magnetic core blocks 10a and 12a to bond to each other by the glass 22a.

Figure 3F:
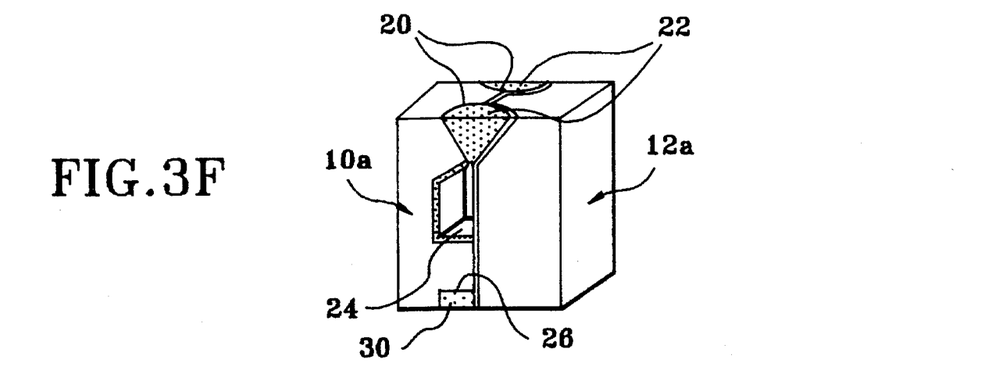

The completely-bonded magnetic core blocks 10a and 12a are cut along a cut line C as shown in FIG. 3E, and, at the same time, an unnecessary portion on the lower portion of the reinforcement groove 16 is cut along a cut line D, so that at least one half-finished magnetic head shown in FIG. 3F is obtained. A plane contacting a magnetic recording medium is abraded in a circular-arc shape, and the coil 18 is wound around the coil groove 14 to complete the magnetic head having the structure shown in FIG. 1.

However, in fabricating the conventional magnetic head, especially in bonding two magnetic core members to each other, the glass layer is molded or sputtered to the magnetic core members forming the magnetic head, so that a gap length control is difficult to be hard to adjust thickness variation of the glass layer. Also, due to the spreading property of the glass, a plurality of magnetic core members cannot be simultaneously handled to block the improvement of productivity. Moreover, since the adhesion process is generally carried at 400° to 700° C., the magnetic property of the material is apt to be degraded.

In other words, the adhesive glass must have a hardness and a spreading property capable of firmly bonding two magnetic ferrite members to each other without causing bubbles. However, the adhesive glass used for the magnetic head according to the conventional technique produces bubbles by the reaction to the stacking layer. The bubbles are confined within the glass to be holes and appear in the contact plane with the recording medium, thereby scratching the recording medium.

SUMMARY OF THE INVENTION

The present invention is devised to solve the above-described problems. Accordingly, it is an object of the present invention to provide a method for fabricating a magnetic head, wherein magnetic core members of a magnetic head fixed on a turntable of a spin coater are bonded to each other by consistently coating a liquid adhesive at a normal temperature under the state of high speed rotation of the turntable to adhere the core members at the normal temperature, thereby facilitating control of the thickness variation without degrading the magnetic head.

To achieve the above object of the present invention, there is provided a method for fabricating a magnetic head for recording audio and/or video signals on a magnetic recording medium and reproducing the recorded signals including the steps of:

stacking a magnetic layer on a substrate formed of a high permeability substance, and performing a heat treatment thereon;

rotating the heat-treated substrate seated on an arrangement jig installed on a turntable in a predetermined speed, and simultaneously dropping to coat an adhesive having a viscosity suitable for the rotation speed and having a consistent spreading property by as much as an amount proper to the rotation speed in a constant ratio onto the substrate in a normal temperature ambient apart from a height which does not cause splash;

sequentially stacking and joining a plurality of substrates coated with the adhesive to form a substrate block;

slicing the substrate block in a predetermined direction at right angles to form at least one pair of magnetic ferrite blocks forming a plurality of magnetic heads;

forming a coil groove and a reinforcement groove in one magnetic ferrite block between the pair of magnetic ferrite blocks;

coating the adhesive on a gap formation plane to a predetermined thickness by rotating other magnetic ferrite block between the pair of magnetic ferrite blocks in the same rotation speed and at the same temperature as above;

bonding the pair of magnetic ferrite blocks at a normal temperature;

cutting the bonded magnetic ferrite blocks in a predetermined direction to obtain the magnetic head of the pair of magnetic ferrite members; and grinding a contact plane with a magnetic recording medium of the magnetic head to have a circular arc shape.

In the method for fabricating the magnetic head, the adhesive consistently spreads on the magnetic ferrite blocks by being dropped from a nozzle over the highly rotatable spin coater, and has a hardness suitable for the bonding.

Preferably, the rotation speed of the spin coater shall be accurately controlled in view of the thickness of the adhesive.

Accordingly, it is preferable that the magnetic ferrite blocks are arranged to be fixed onto the rotatable spin coater having a turntable, and the adhesive is dropped from the nozzle of the spin coater to consistently spread over the magnetic ferrite blocks while the spin coater is rotated in high speed.

Also, the adhesive has a viscosity of 60 to 100 g $Cm^{-1}$ $Sec^{-1}$, and the rotation speed of the spin coater is 6,000 to 20,000 rpm.

Preferably, a vertical height of a nozzle over the spin coater and the magnetic ferrite block is 5 cm, and the bonding step by means of the adhesive is carried out at a normal temperature of below 100° C.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 4A:
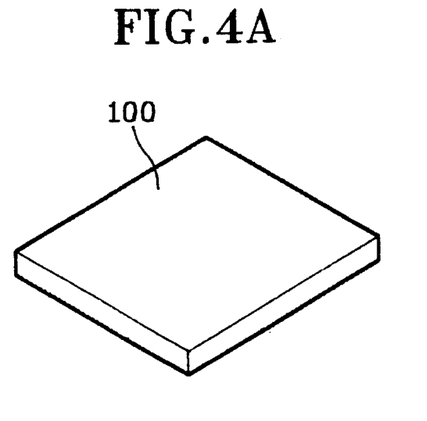
FIGS. 4A to 4J are views showing a fabricating process of a magnetic head according to the present invention.
Figure 4B:
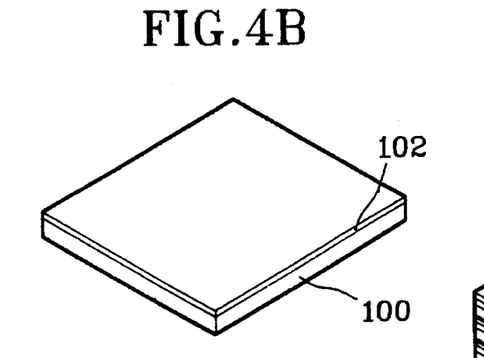

Referring to FIG. 4 showing a fabricating process of a magnetic head according to the present invention, a magnetic head is fabricated in such a manner that a magnetic layer 102 of such as a sendust being an alloy of Fe—Si—Al is stacked on a ceramic substrate 100 to a thickness of, e.g., about 5 to 15 μm as shown in FIG. 4A, and then subjected to a heat treatment (FIG. 4B). The ceramic substrate 100 stacked with the magnetic layer 102 thereon is rotated, using a spin coater which will be described later.

Figure 4C:
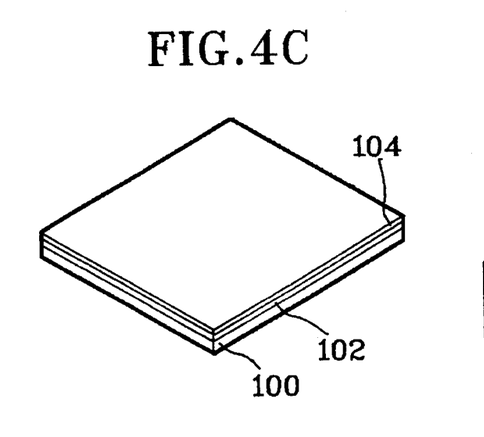

Here, the spin coater is rotated in a predetermined rotation speed, e.g., 6,000 to 20,000 rpm. At this time, as shown in FIG. 4C, an adhesive 104 is dropped onto the magnetic layer 102, and consistently covers the magnetic layer 102 by the rotational force of the spin coater. Preferably, the thickness of the coating adhesive 104 is about 500 to 1,000 Å.

Figure 4D:
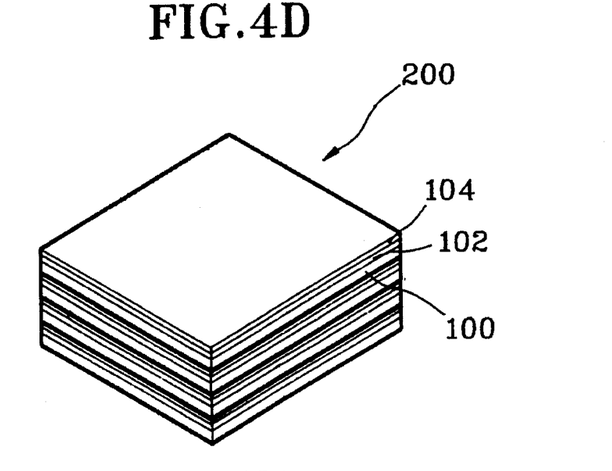

Several substrates 100 coated with the adhesive 104 are adhered to each other, thereby obtaining a substrate block 200 as shown in FIG. 4D.

Figure 4E:
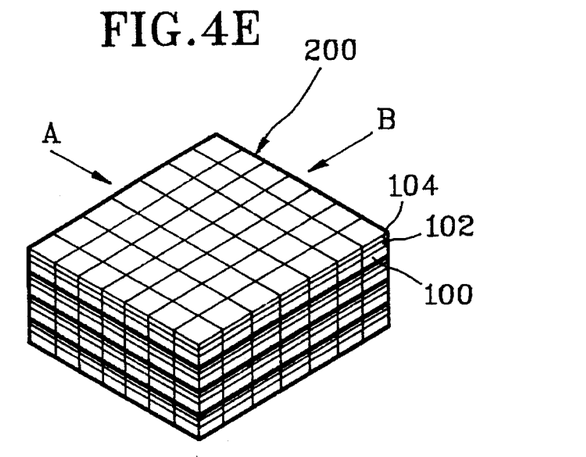
Figure 4F:
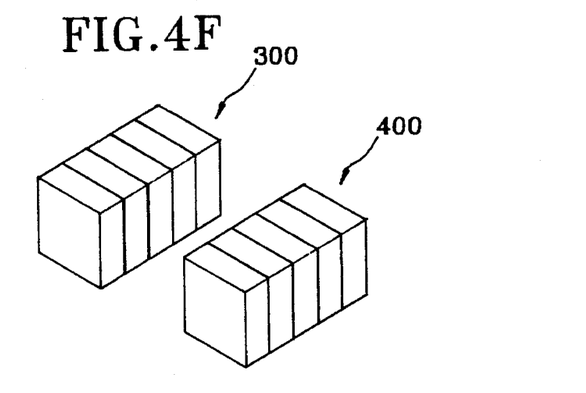

The substrate block 200 shown in FIG. 4D is sliced by a suitable slicing machine to slice in the direction of arrows A and B as shown in FIG. 4E, so that a plurality of magnetic ferrite blocks 300 and 400 as shown in FIG. 4F are fabricated.

Figure 4G:
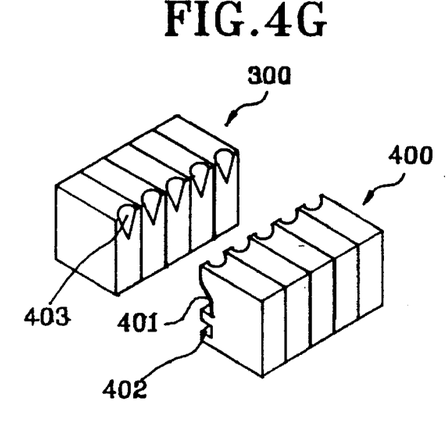

Here, the magnetic ferrite block 400 is provided with a coil groove 401, a reinforcement groove 402 and a track-width restraining joint groove 403 as shown in FIG. 4G. The magnetic ferrite block 300 is coated with an adhesive 301 which will be described in detail with reference to FIG. 5.

Figure 4H:
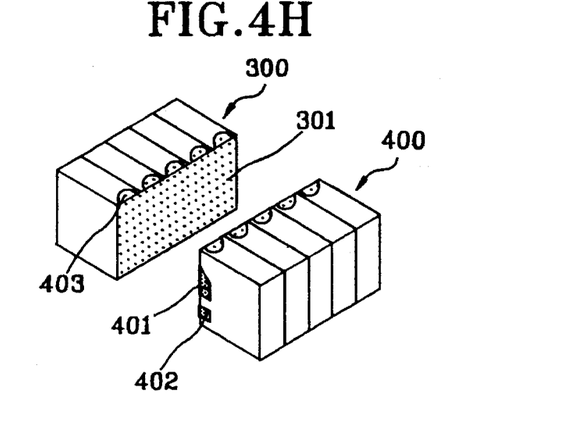
Figure 5:
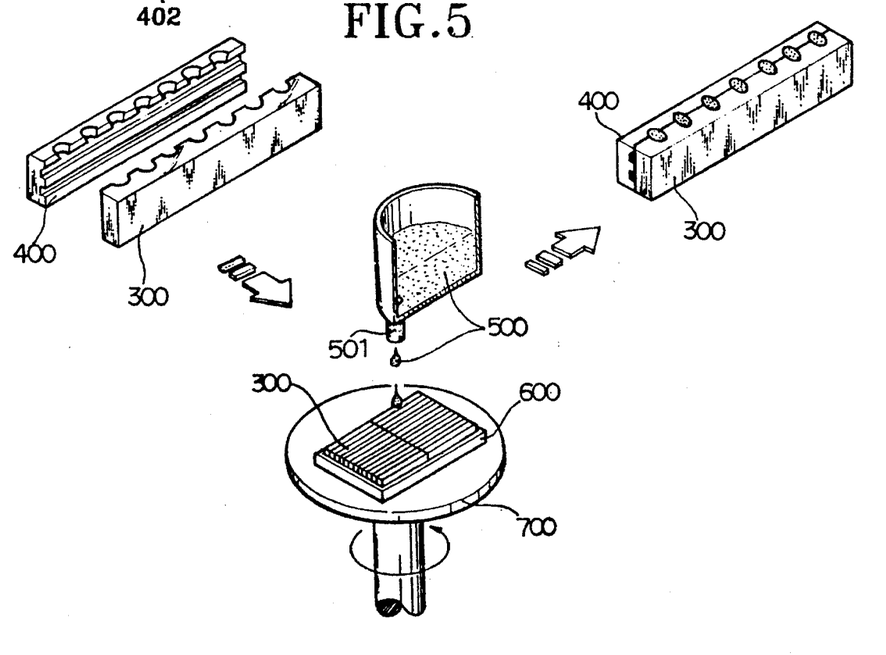
FIG. 5 is a view for facilitating the understanding of the bonding process by the spin coater employed in the present invention.

FIG. 5 is a view for illustrating the coating of the adhesive 500 on the magnetic ferrite block 300 in order to mutually adhere the magnetic ferrite blocks 300 and 400 shown in FIG. 4H.

The magnetic ferrite block 300 formed as described above is arranged to be fixed onto an arrangement jig 600 which is then fixed onto a turntable 700 of the spin coater in a proper way. Under the state that the turntable 700 is rotated at high speed of, e.g., 6,000 to 20,000 rpm, the liquid adhesive 500 is dropped from a nozzle 501 over the spin coater at a normal temperature of, e.g., below 100 C. to allow the liquid adhesive 500 to be coated on the magnetic ferrite block 300 to a thickness of, e.g., 500 to 1,000 Å. At this time, the preferable clearance (vertical height) between the nozzle 501 and magnetic ferrite block 300 is approximately 5 cm.

Figure 6:
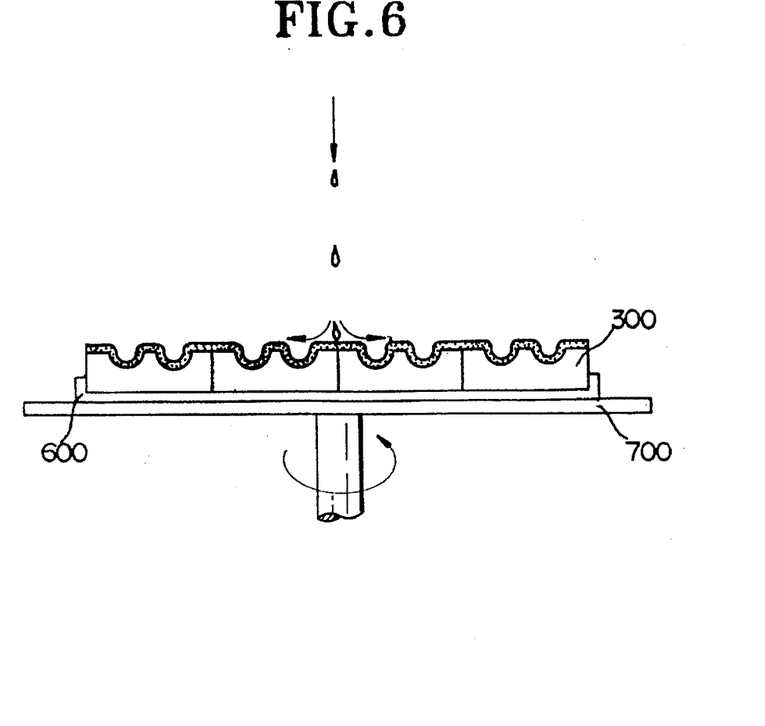
FIG. 6 is a side view showing a coating method of an adhesive by a spin coater.
Figure 7:
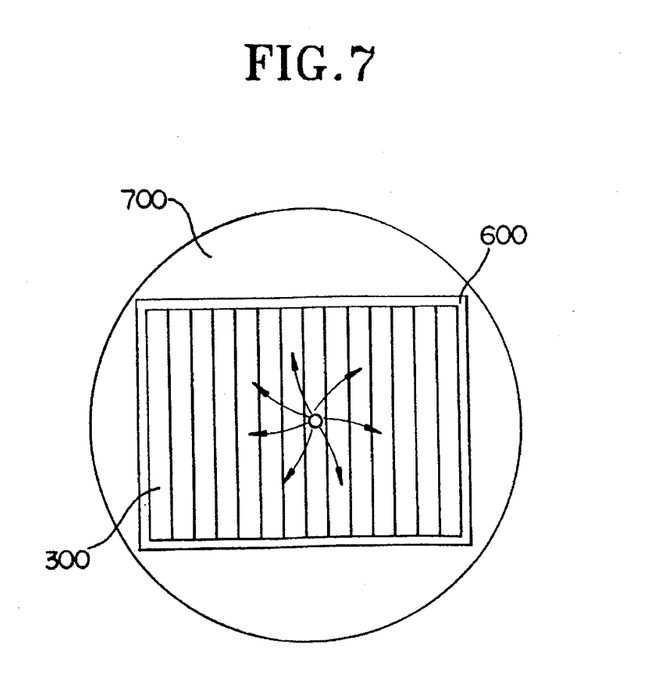
FIG. 7 is a plan view the coating method of FIG. 6.

Now, as shown in FIGS. 6 and 7, the liquid adhesive 500 may be coated by consistently spreading over a gap formation plane of the magnetic ferrite block 300 by the centrifugal force of the rotating turntable 700. Therefore, any adhesive having an excellent adhesion property may be good enough as the liquid adhesive 500, but an adhesive of a low-priced and easily-purchasable epoxy group is preferable. Additionally, preferable liquid adhesive 500 has excellent spreading property, hardness and viscosity without causing bubbles. The adhesive used in the present invention has a viscosity of 60 to 100 Poise (g $Cm^{-1}$ $Sec^{-1}$), and preferably about 80 Poise.

Figure 4I:
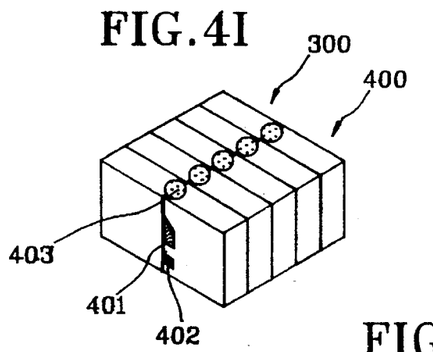

After coating the adhesive, the rotation of the turntable 700 is stopped. Then, the arrangement jig 600 arranged with the magnetic ferrite block 300 is separated, and the magnetic ferrite blocks 300 and 400 contact each other to be pressed by a predetermined pressure, thereby completing the bonding (refer to FIGS. 4I and 5).

Figure 4J:
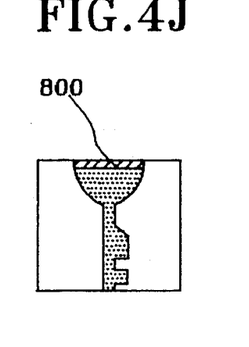

As shown in FIG. 4J, in view of the contact with the magnetic recording medium, a glass 800 ($SiO_2$) of an anti-abrasion material is coated on the upper portion of the track-width restraining joint groove via a common method.

Thereafter, similarly to FIG. 3E, a slicing is carried out, and the upper surface is subjected to an circular-arc processing to fabricate the magnetic head.

In the present invention as described above, under the state that the magnetic ferrite block 300 arranged to be fixed onto the arrangement jig 600 is rotated in high speed, the liquid adhesive 500 is dropped to consistently coat by means of the centrifugal force of the turntable 700, so that the thickness variation of the adhesive is very easily controlled when compared with the conventional method for bonding the magnetic ferrite blocks to each other by inserting a glass rod.

Furthermore, the adhesive is coated after arranging the plurality of magnetic ferrite blocks on the arrangement jig to improve productivity. By performing the coating of the liquid adhesive at a normal temperature, the magnetic property of the magnetic head is never degraded.

As described above, according to the method for fabricating a magnetic head of the present invention, after magnetic ferrite blocks of a magnetic head are fixed on a turntable, a liquid adhesive is consistently coated while rotating the turntable in high speed to bond two magnetic ferrite blocks at a normal temperature, so that the magnetic head is never degraded and the thickness variation of the adhesive is easily controlled.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for fabricating a magnetic head for recording audio/video signals on a magnetic recording medium and reproducing the recorded signals comprising the steps of:

stacking a magnetic layer on a substrate formed of a high permeability substance, and performing a heat treatment thereon;

seating the heat-treated substrate on a spin-coating apparatus including a turntable and nozzle device;

rotating said turntable at a predetermined speed while simultaneously dropping a liquid adhesive from said nozzle device onto said substrate to form an adhesive layer thereon at a normal ambient temperature, said nozzle device being positioned above a surface of said substrate at a distance sufficient to avoid splashing of said liquid adhesive, said adhesive having a viscosity suitable for the rotation speed and having a consistent spreading property by as much as an amount proper to said rotation speed in a constant ratio;

sequentially stacking and joining a plurality of substrates coated with said adhesive to form a substrate block;

slicing said substrate block in a predetermined direction at right angles to form at least one pair of magnetic ferrite blocks forming a plurality of magnetic heads;

forming a coil groove and a reinforcement groove in one magnetic ferrite block between said pair of magnetic ferrite blocks;

coating said adhesive on a gap formation plane to a predetermined thickness by rotating other magnetic ferrite block between said pair of magnetic ferrite blocks in the same rotation speed and at the same temperature as above;

bonding said pair of magnetic ferrite blocks at a normal temperature;

cutting said bonded magnetic ferrite blocks in a predetermined direction to obtain said magnetic head of said pair of magnetic ferrite members; and grinding a contact plane with a magnetic recording medium of said magnetic head to have a circular arc shape.

2. A method for fabricating a magnetic head as claimed in claim 1, wherein said adhesive has a viscosity of 60 to 100 $g.Cm^{-1}.Sec^{-1}$.

3. A method for fabricating a magnetic head as claimed in claim 1, wherein the bonding step by means of said adhesive is carried out on a normal temperature of below 100° C.

4. The method for fabricating a magnetic head as claimed in claim 1 wherein said liquid adhesive is an epoxy adhesive.

5. A method for fabricating a magnetic head for recording audio/video signals on a magnetic recording medium and reproducing the recorded signals comprising the steps of:

stacking a magnetic layer on a substrate formed of a high permeability substance, and performing a treatment thereon;

seating the heat-treated substrate on a spin-coating apparatus including a turntable and nozzle device;

rotating said turntable at a predetermined speed while simultaneously dropping an epoxy adhesive from said nozzle device onto said substrate to form an adhesive layer thereon at a normal ambient temperature, said nozzle device being positioned above a surface of said substrate at a distance sufficient to avoid splashing of said epoxy adhesive, said adhesive having a viscosity suitable for the rotation speed and having a consistent spreading property by as much as an amount proper to said rotation speed in a constant ratio;

sequentially stacking and joining a plurality of substrates coated with said adhesive to form a substrate block;

slicing said substrate block in a predetermined direction at right angles to form at least one pair of magnetic ferrite blocks forming a plurality of magnetic heads;

forming a coil groove and a reinforcement groove in one magnetic ferrite block between said pair of magnetic ferrite blocks;

coating said adhesive on a gap formation plane to a predetermined thickness by rotating other magnetic ferrite block between said pair of magnetic ferrite blocks in the same rotation speed and at the same temperature as above;

bonding said pair of magnetic ferrite blocks at a normal temperature;

cutting said bonded magnetic ferrite blocks in a predetermined direction to obtain said magnetic head of said pair of magnetic ferrite members; and grinding a contact plane with a magnetic recording medium of said magnetic head to have a circular arc shape.

6. A method for fabricating a magnetic head as claimed in claim 5, wherein said adhesive has a viscosity of 60 to 100 g—$Cm^{-1}.Sec^{-1}$.

7. A method for fabricating a magnetic head as claimed in claim 5, wherein the bonding step by means of said adhesive is carried out on a normal temperature of below 100° C.

* * * * *